US009288632B2

(12) United States Patent
Yang et al.

(10) Patent No.: US 9,288,632 B2
(45) Date of Patent: Mar. 15, 2016

(54) SIMULTANEOUS LOCALIZATION AND MAPPING USING SPATIAL AND TEMPORAL COHERENCE FOR INDOOR LOCATION

(75) Inventors: Shao-Wen Yang, Hillsboro, OR (US); Xue Yang, Arcadia, CA (US); Lei Yang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,563

(22) PCT Filed: May 1, 2012

(86) PCT No.: PCT/US2012/035952
§ 371 (c)(1),
(2), (4) Date: Mar. 21, 2014

(87) PCT Pub. No.: WO2013/165391
PCT Pub. Date: Nov. 7, 2013

(65) Prior Publication Data
US 2014/0295878 A1    Oct. 2, 2014

(51) Int. Cl.
*H04W 4/04* (2009.01)
*G01S 5/02* (2010.01)
(52) U.S. Cl.
CPC ............... *H04W 4/04* (2013.01); *G01S 5/0252* (2013.01); *G01S 5/0257* (2013.01)
(58) Field of Classification Search
CPC ....... H04W 4/04; H04W 4/043; H04W 84/14; G01S 5/052; G01S 5/0257; G01S 3/02; G01S 17/06
See application file for complete search history.

(56) References Cited

U.S. PATENT DOCUMENTS

| 8,934,923 | B1 * | 1/2015 | Golden .......................... 455/457 |
| 8,977,287 | B1 * | 3/2015 | Gold et al. ................. 455/456.1 |
| 2011/0106449 | A1 * | 5/2011 | Chowdhary et al. .......... 701/214 |
| 2014/0194139 | A1 * | 7/2014 | Yang et al. ................. 455/456.1 |

OTHER PUBLICATIONS

International Search Report and Written Opinion received for PCT Patent Application No. PCT/US2012/035952, mailed on Mar. 15, 2013, 8 pages.
Vorst, et al., "Efficient Self-Adjusting, Similarity-Based Location Fingerprinting with Passive UHF RFID", Sep. 15-16, 2011, pp. 160-167.
Reid, et al., "Large-Scale Multi-Robot Mapping in MAGIC 2010", 2011 IEEE Conference, Sep. 17-19, 2011, pp. 239-244.
Li, et al., Autonomous Learning of Vision-Based Layered Object Models on Mobile Robots', IEEE International Conference on Robotics and Automation, May 9-13, 2011, 6 pages.
International Preliminary Report on Patentability and Written Opinion received for PCT Patent Application No. PCT/ US2012/035952, mailed on Nov. 13, 2014, 5 pages.
Office Action received for Australian Patent Application No. 2012379101, mailed on Apr. 11, 2015, 2 pages.

* cited by examiner

*Primary Examiner* — Brandon Miller
(74) *Attorney, Agent, or Firm* — Forefront IP Lawgroup, PLLC

(57) ABSTRACT

This document discloses one or more systems, apparatuses, methods, etc. for detecting precise indoor location of a portable wireless device based on a WiFi simultaneous localization and mapping (SLAM) algorithm that implements spatial and temporal coherence. In an implementation, a SLAM algorithm includes WiFi similarities and inertial navigational system (INS) measurements data as location estimates (i.e., references) for the spatial and temporal coherences implementations to constitute the WiFi SLAM algorithm.

29 Claims, 6 Drawing Sheets

SIMULTANEOUS LOCALIZATION AND MAPPING USING SPATIAL AND TEMPORAL COHERENCE FOR INDOOR LOCATION

BACKGROUND

Deriving an accurate indoor location of a wireless device has been an increasingly important topic of mobile wireless devices. Despite research and development efforts, enabling and providing accurate indoor location capability remains a challenging topic. Limitations of the current indoor location systems may be in regard to their performance inadequacy or due to requirements for substantial infrastructure to desired indoor location capabilities.

WiFi (i.e., Institute of Electrical and Electronics Engineers' (IEEE) 802.11 standards) based indoor location technologies particularly attracted a lot of attention given wide deployment of wireless local area network (WLAN) infrastructure. For example, there are current methods for indoor location determination that uses the WLAN infrastructure. One method is based on propagation models, using estimated degradation of signal strength over distance in space from a known location of access point (AP) and transmit power e.g., Sky Hook™). Another method relies on storing pre-recorded calibration WiFi measurement data (i.e., WiFi fingerprinting) in order to generate a radio frequency (RF) map of a building, such as Ekahau™ and Qubulus™. Another method utilizes a measurement of WiFi radio wave time of flight to measure distance.

"WiFi fingerprinting" has been shown that it may reach meter level accuracy as long as the pre-calibrated database has sufficiently dense calibration points (i.e., meter grid). The method derived from Sky Hook™ has a median error of approximately 11 m and mean error of approximately 25 m. The method using time of flight method may reach approximately about 3-5 meter accuracy, and may be constrained by indoor mufti-path environment. Existing implementations of the "WiFi fingerprinting," such as the Ekahau™ and Qubulus™ may require initial training to correlate each location with corresponding WiFi received signal strength indicator (RSSI) fingerprint, which leads to substantial efforts to deploy such location systems, especially when the calibration points are dense. Also, the calibration points often need to be re-performed as deployment environment changes. The substantial deployment effort is one of the primary reasons why "WiFi finger printing" based location system has not been widely adopted. Accordingly, a solution may be implemented to provide precision accuracy for indoor location of the wireless device with minimal human deployment efforts.

The following Detailed Description is provided with reference to the accompanying figures. In the figures, the leftmost digit(s) of a reference number usually identifies the figure in which the reference number first appears. The use of the same reference numbers in different figures indicates similar or identical items.

DETAILED DESCRIPTION

This document discloses one or more systems, apparatuses, methods, etc, for detecting precise indoor location of a wireless device based on a WiFi simultaneous localization and mapping (SLAM) algorithm that implements spatial and temporal coherence. A SLAM algorithm includes solutions to a problem of constructing a map for an unknown environment and, at the same time, determining physical location of the wireless device when navigating the mapped environment. In an implementation, the SLAM algorithm includes WiFi similarities and inertial navigational system (INS) measurements data as location estimates (i.e., references) for the spatial and temporal coherences implementations to constitute the WiFi SLAM algorithm. In this implementation, the WiFi SLAM algorithm is implemented to detect a "loop closing" that includes a physical location "revisit point" for the wireless device. For example, the detection of the "loop closing" includes the temporal coherence of the a) WiFi similarities and b) spatial coherence of the estimated trajectory from INS measurements data—at different time stamps. In this example, the temporal coherence is configured to include a threshold in providing confidence level for the detection of the "loop closing." The confidence level indicates the likelihood of the "loop closing" occurrence. The WiFi SLAM algorithm then output location estimates and WiFi fingerprint map based on "loop closing" constraints.

In other implementations, other types of radio signals other than WiFi signals may be used as the location estimates for the spatial and temporal coherences implementations. For example, cellular signal similarities may be used in lieu of the WiFi similarities at a certain "revisit point." In other examples, Bluetooth™ signals, and other wireless signals may be used.

Figure 1:
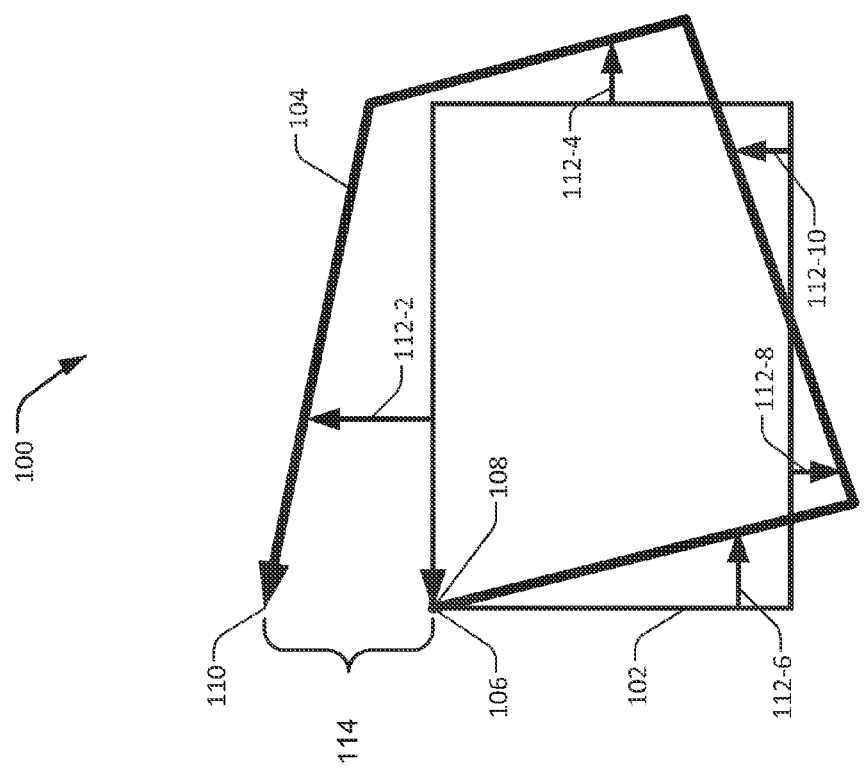
FIG. 1 illustrates an example simultaneous localization and mapping (SLAM) loop closing example.

FIG. 1 illustrates a SLAM loop closing example 100 that shows an ideal trajectory output loop 102 and an actual trajectory output loop 104. In this illustration, the ideal and the actual trajectory outputs 102 and 104 are both initialized to start at a starting point 106. The ideal trajectory output loop 102 is defined to end at the same starting point 106 after traversing through different points (not shown) that are located along the loop 102. For example, a wireless device (not shown) is walked through the loop 102, from the starting point 106 to the different points (not shown) along the loop 102 and ending at an endpoint 108 that is similar to the starting point 106, to form the ideal trajectory output 102. Meanwhile, the actual trajectory output loop 104 is started at the same starting point 106, traverses different points (not shown) along the actual trajectory output loop 104, and ends at an ending point 110. The actual trajectory output loop 104 may include typical output of the SLAM algorithm due to various factors, such as inertial sensor drift errors, WiFi unreliability, surrounding noise, etc. The typical output (i.e., actual trajectory output loop 104) for the SLAM algorithm may provide deviations 112 that include variations of the typical output from the ideal trajectory output 102. For example, the deviations 112 may include deviation 114 between the ending points 110 and 108 of the actual trajectory output loop 104 and the ideal trajectory output loop 102, respectively. In an implementation, a detection of the ending point 108 as a physical location "revisit point" for the wireless device (not shown) may reduce the deviations 112. For example, the SLAM algorithm is integrated with spatial and temporal coherence of location estimates (e.g., WiFi similarities and INS measurements) to create a WiFi SLAM algorithm. The WiFi SLAM algorithm may generate accurate estimates of the physical location "revisit point" that may be used to correct the deviations 112 in the typical output of the SLAM algorithm.

Figure 2:
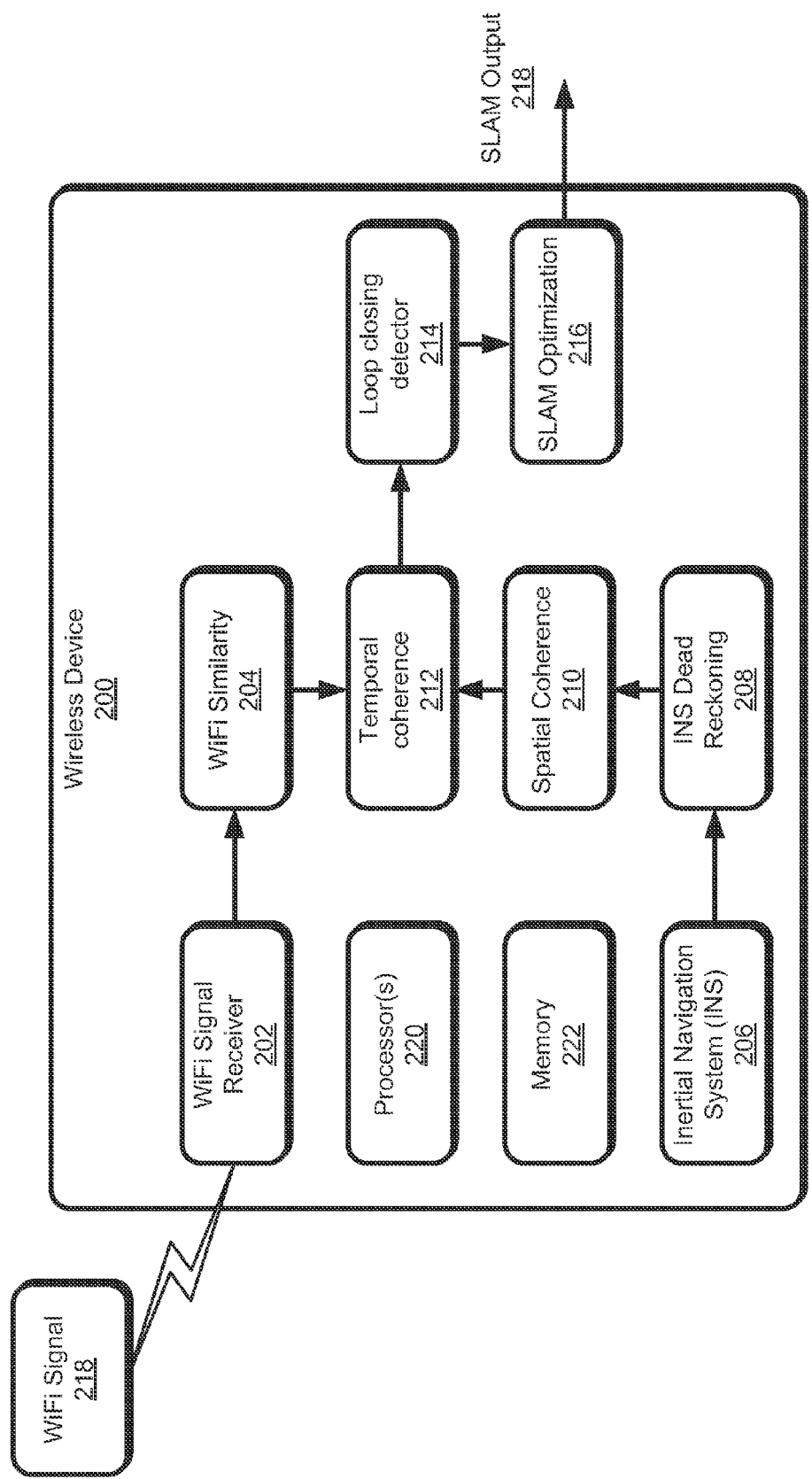
FIG. 2 illustrates an example wireless device that implements WiFi simultaneous localization and mapping (SLAM) algorithm.

FIG. 2 illustrates an example wireless device 200 that implements the WiFi SLAM algorithm to generate a location estimate and a WiFi fingerprint map for the wireless device 200. Examples of such wireless device 200 include (but are not limited to) a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like. The location estimate may include a precise physical location of the wireless device 200, such as when the wireless device 200 traverses a particular point along the loop 102 of FIG. 1. On the other hand, the WiFi fingerprint map may include construction of the RF map that has been navigated by the wireless device 200.

In an implementation, the WiFi SLAM algorithm includes the SLAM algorithm approach that is integrated with the INS measurements data and the WiFi signals to provide a) reduction in deployment efforts in the WiFi fingerprinting; b) to automatically generate the WiFi fingerprint map at fine granularity and without human intervention; and c) to achieve a meter level physical location accuracy through global optimization of the WiFi SLAM algorithm. Furthermore, rather than relying on the WiFi signals alone for the "loop closing" detection, the "revisit point" is detected through the WiFi SLAM algorithm by analyzing spatial and temporal coherence in the INS measurements data and the WiFi signals. The rationale is, if the two locations are physically close, then the local spatial and temporal coherence (i.e., structure) between an INS estimated trajectory and the WiFi signals would be similar.

In an implementation, with continuing reference to FIG. 2, the wireless device 200 includes a WiFi signal receiver component 202, a WiFi similarity component 204, an INS component 206, an INS dead reckoning estimator component 208, a spatial coherence component 210, a temporal coherence component 212, and a loop closing detector 214 that provides a WiFi SLAM output 218 (i.e., the location estimate and WiFi fingerprint map of the wireless device 200). In an implementation, the WiFi signal receiver component 202 may scan and use a radio signal, such as a WiFi signal 218 to detect at least one received signal strength indicator (RSSI) input signal from a particular access point (AP) (not shown) that transmits the WiFi signal 218. In other implementations, the WiFi signal receiver component 202 may scan the WiFi signal 218 to detect other signal properties other than RSSI, such as signal time-of-flight and channel fading profiles. In other implementations, the WiFi signal receiver component 202 may include any receiver component that receives radio signals, such as a cellular signal (not shown), a Bluetooth™ signal (not shown), an RF signal, and the like, which generates measurements of the at least one RSSI input signal, or the signal time-of-flight, or the channel fading profiles. The receiving of the WiFi signal 218 updates a current sample (e.g., RSSI input signal) from a previous time step. In an implementation, the WiFi similarity component 204 may implement an algorithm to compare the received WiFi signal 218 from the current sample in the previous time step. In this implementation, the WiFi similarity component 204 determines WiFi similarity along traversed trajectory to estimate the revisit point based on the received WiFi signal 218. In other implementations, the WiFi similarity component 204 may include other types of radio similarity component that compares the received cellular signal (not shown), the Bluetooth™ signal (not shown), and the like, at different time steps.

Ideally, the WiFi similarity component 204 may measure the same power levels at the "revisit point" due to underlying assumption that the same WiFi measurements correspond to the same physical location, such as the loop closing endpoint 108 in FIG. 1. However, due to unreliable characteristics of the WiFi signal 218, such as small scale fading, two very close physical locations may have different RSSI measurements. At the same time, two similar RSSI measurements may not necessarily be located at the same physical location (e.g., endpoint 108 in FIG. 1). To this end, an output of the WiFi similarity 204 is taken as a first level coarse indicator to capture the similarity between two (almost) identical physical locations by quantifying the similarity in the measured power levels.

In an implementation, the INS component 206 may include motion sensors, such as accelerometers (not shown) and rotation sensors, such as gyroscopes (not shown), or magnetometer (not shown), pressure sensor (not shown) and the like. In this implementation, the INS component 206 may continuously receive and update measurements data at every time step (e.g., time step "t"). In an implementation, the measurements data may be utilized by the INS dead reckoning estimator component 208 to continuously calculate position, orientation, direction, and speed of movement of the wireless device 200 at every time step. The calculation via the INS dead reckoning estimator component 208 may be performed without need for external references. For example, if the wireless device 200 is at point (x, y) at a particular time and due to acceleration, changes (dx, dy) are detected by the INS component 206 at another time, then the wireless device 200 may be assumed to have moved to point (x+dx, y+dy) without need of the external references. In an implementation, the INS dead reckoning estimator component 208 may provide estimated motion trajectory that undergoes spatial coherence processing at the spatial coherence component 210.

In an implementation, the spatial coherence processing at the spatial coherence component 210 takes into consideration the similarity of the local trajectory structure when the wireless device 200 moves back to the "revisit point." In other words, around the same physical location, the motion trajectory estimation from the INS dead reckoning estimator component 208 may have similar spatial structure. The principle of spatial coherence is implemented to distinguish trajectories with different local structures based on the calculations provided by the INS dead reckoning estimator component 206 at different time steps t, t+1, t+2, etc. The spatial coherence principle is imposed by taking into account quality of matching according to an estimation of the local structures. To this end, an output for the spatial coherence implementation may provide a good indication of confidence level of the measurements data when the wireless device 200 traverses the "revisit point." The spatial coherence implementation may use standard computational algorithms to correlate the motion estimation at different time steps t, t+1, t+2, etc.

In an implementation, the temporal coherence component 212 may implement temporal coherence processing on the spatial coherence level derived from the spatial coherence component 210 and the received first level coarse indicator from the WiFi similarity component 204. In this implementation, an accurate estimation that the "revisit point" is traversed by the wireless device 200 may be provided. The temporal coherence may apply standard computational algorithms to correlate the spatial coherence level and the first level coarse indicator. For example, the temporal coherence component 212 may use sequence alignment algorithm to estimate the close loop. In this example, the sequence alignment algorithm assumes the estimated locations within a pre-defined time step window (e.g., time steps "t" to "t+5) to be dissimilar. From this assumption, the sequence alignment algorithm searches for similar sequences outside of the pre-defined time step window (e.g., search is made starting on time step "t+6"). In an implementation, the temporal coherence component 212 utilizes fuzzy matching algorithm to detect similarity in multiple time steps.

In an implementation, the loop closing detector 214 may be configured to estimate loop closing detection when a certain threshold for the temporal coherence detection is satisfied. The threshold may be configured to include a minimum length of matching sequence to an output of the temporal coherence component 212 to declare that the wireless device 200 traversed the "revisit point." For example, the threshold includes a matching sequence threshold of five to gauge matching confidence level. In this implementation, the longer the matched sequence (e.g., greater than five), the more possible is a positive match for the occurrence of the "revisit point." Furthermore, a SLAM optimization component 216 may utilize the detected "revisit point" from the loop closing detector 214 as an optimization constraint by the WiFi SLAM algorithm to optimize the trajectory estimation and the WiFi fingerprint map generation.

The wireless device 200 may include one or more processor 220. Processor(s) 22.0 may be a single processing unit or a number of processing units, all of which may include single or multiple computing units or multiple cores. The processor 220 may be implemented as one or more microprocessors, microcomputers, microcontrollers, digital signal processors, central processing units, state machines, logic circuitries, and/or any devices that manipulate signals based on operational instructions. Among other capabilities, the processor 220 may be configured to fetch and execute computer-readable instructions or processor-accessible instructions stored in a memory 222 or other computer-readable storage media.

In certain implementations, the memory component 222 is an example of computer-readable storage media for storing instructions, which are executed by the processor 220 to perform the various functions described above. For example, memory 222 may generally include both volatile memory and non-volatile memory (e.g., RAM, ROM, or the like). Memory 222 may be referred to as memory or computer-readable storage media herein. Memory 222 is capable of storing computer-readable, processor-executable program instructions as computer program code that may be executed by the processor 220 as a particular machine configured tier carrying out the operations and functions described in the implementations herein.

The example wireless device 200 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Spatial Coherence Feature

Figure 3:
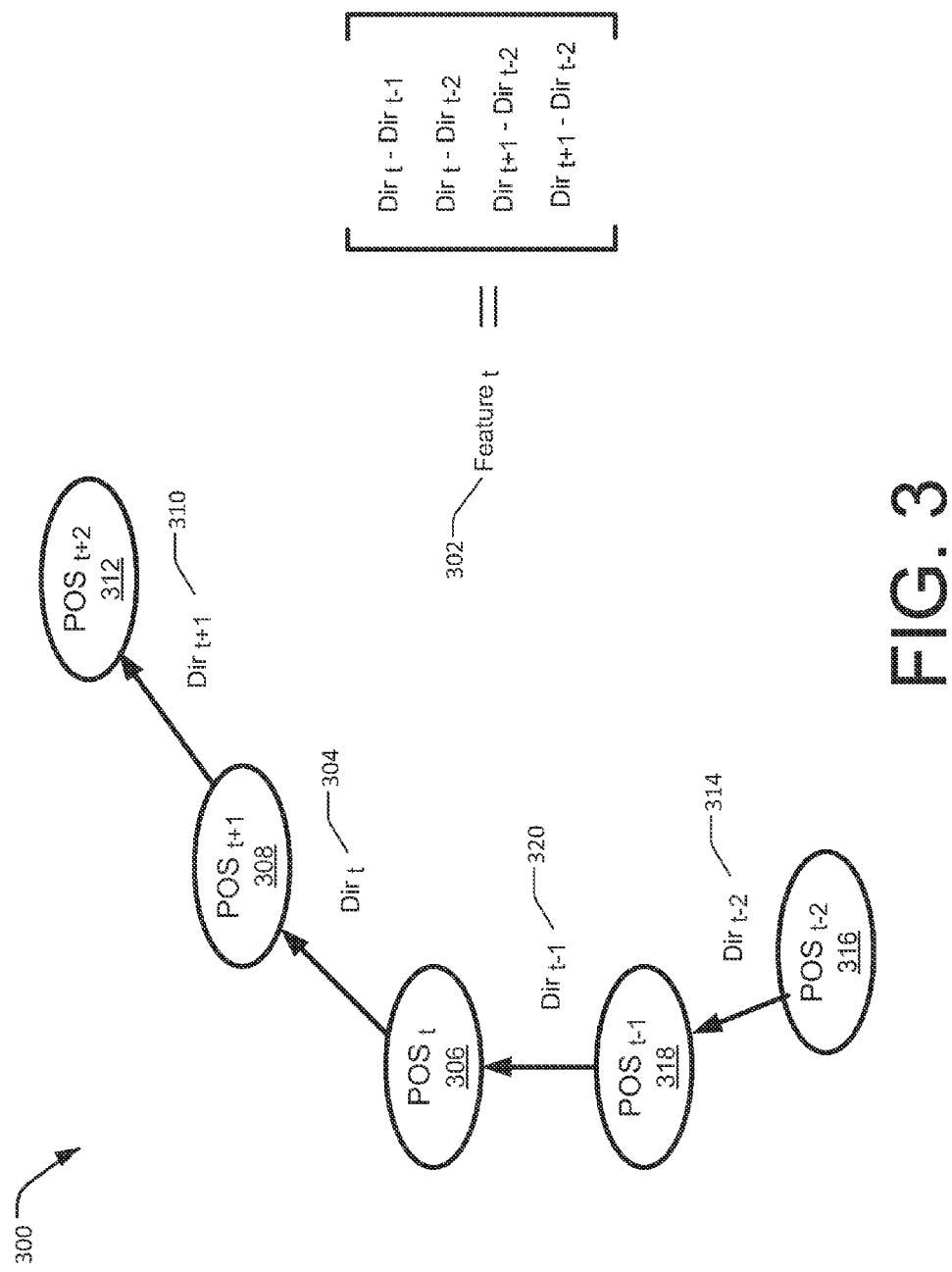
FIG. 3 illustrates an exemplary spatial coherence feature variable.

FIG. 3 illustrates an exemplary spatial coherence implementation 300 to provide the spatial coherence level of "loop closing" detection. In an implementation, an angular feature 302 may be defined to capture the local trajectory change that reflects the environmental structure. For example, at time step window size of five for a particular segment, the angular feature 302 for the particular segment may estimate whether or not the segment traverses the "revisit point." In other implementations, the spatial coherence features may be based on other trajectory features other than the angular feature 302, such as distance or location displacement feature, height feature and/or inclination feature. In this example, the multiple time step scale manner is used to deal with disorder and non-atomicity of the INS component 206 measurements data. The disorder from the inaccurate detection of motions in the INS component 206 measurements data may result in a time step drift, particularly while wireless device 200 performs a turning movement. The non-atomicity relates to the varying human motions and the smoothing nature of inertial measurements data by the INS component 206. Furthermore, representing the feature 302 at multiple time step scales may capture changes in the trajectory at a higher level of abstraction. In other implementations, an adaptive time step window size may be implemented (e.g., time step window size of 3, or 4, or 6, etc.)

Figure 4:
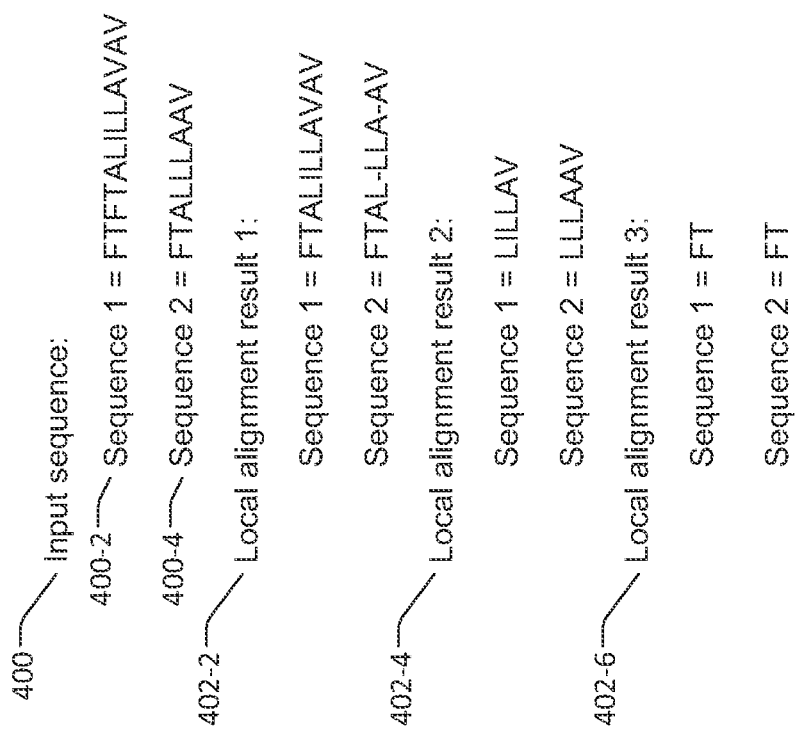
FIG. 4 illustrates an example sequence alignment for searching all possible lengths of a matching sequence.

With continuing reference to FIG. 3, $Dir_t$ 304 represents the direction from estimated positions $Pos_t$ 306 to $Pos_{t+1}$ 308, $Dir_{t+1}$ 310 represents the direction from estimated positions $Pos_{t+1}$ 308 to $Pos_{t+2}$ 312, $Dir_{t-2}$ 314 represents the direction from estimated positions $Pos_{t-2}$ 316 to $Pos_{t-1}$ 318, and $Dir_{t-1}$ 320 represents the direction from estimated positions $Pos_{t-1}$ 318 to $Pos_t$ 306. The local structure trajectory defined by the $Pos_{t-2}$ 316 to $Pos_{t+2}$ 312 includes the segment for the time steps "t−2" to "t+2." In an implementation, the defined angular feature 302 is a vector consisting of the angular deviation from $Dir_{t-1}$ 320 to $Dir_t$ 304, from $Dir_{t-2}$ 314 to $Dir_t$ 304, from $Dir_{t-1}$ 320 to $Dir_{t+1}$ 310, and from $Dir_{t-2}$ 314 to $Dir_{t+1}$ 310. In this implementation, the angular feature 302 of the segment at multiple time steps "t−2" to "t+2" may indicate whether or not the segment is a "revisit point." In other words, the spatial dissimilarity between pairs of locations may be captured based on the spatial coherence feature 302 that is defined to include various metric. For example, the metric may use mean difference between spatial coherence features 302. In this example, the spatial coherence may serve as a strong negative indicator to disambiguate the true revisiting from the false revisiting of the "revisit point" that is identified by unreliable WiFi signal measurements in the typical output of the SLAM algorithm. In other examples, the metric may use other similarity measures, such as Euclidian distance or correlation coefficients between coherence features to Example Temporal Coherence FIG. 4 illustrates sequence alignment examples for searching all possible lengths of matching sequence. In an implementation, the temporal coherence component 212 captures the local structure similarity in consecutive time steps t, t+1, t+2, etc. For example, due to highly constrained indoor physical environment, if a "revisiting" of the wireless device 200 has occurred at one physical location at a particular time step, then the "revisiting" may similarly occur several time steps following the "revisited locations" as well. In this example, sequence alignment techniques may be implemented to extract coherent time subsequences. The sequence alignment technique may be based on a known fuzzy matching techniques working with matches that may be not perfect when finding correspondences. In other words, the sequence alignment technique may include approximation techniques rather than fixed and exact matches find the correspondences.

In an implementation, the sequence alignment technique may extract matching sequence of all possible lengths. Different existing algorithms for the sequence alignment technique may be implemented to extract the matching sequence of all possible lengths. For example, a basic sequence alignment technique is illustrated in FIG. 4. In this example, the similarity between pairs of entries (e.g., letter F, T, or A, etc.) is simply defined by equality. In an implementation, each of the entries (e.g., letter F, T, or A, etc) is a compound of a spatial location (e.g., feature 302) and a set of WiFi measurements that include the first level coarse indicator data (i.e., output of the WiFi similarity component 204). The similarity between the pairs is defined jointly by the output of the WiFi similarity component 204 and the spatial coherence implementation at the spatial coherence component 210. The matching sequence threshold (e.g., five steps) is used as the temporal coherence measure to gauge matching confidence level. The longer matched sequence may provide more confidence level of positive match. The length constraint is a trade-off between precision and recall (i.e., detection rate), and may depend on the noise level of inertial sensor input at the INS component 206 and WiFi measurement inputs at the WiFi signal receiver 202.

With continuing reference to FIG. 4, the WiFi SLAM algorithm may include an input sequence 400 that includes a first sequence 400-2 and a second sequence 400-4. The first sequence 400-2 may include the entries (e.g., letter F, T, or A, etc) that contains the compound of the spatial location (e.g., feature 302) and the set of WiFi measurements that include the first level coarse indicator data (i.e., output of the WiFi similarity component 302). Similarly, the second sequence 400-4 may include the entries (e.g., letter F, T, or A, etc) that contains the compound of the spatial location and the set of WiFi measurements at different time steps. In an implementation, the first sequence 400-2 is compared with the second sequence 400-4. In this implementation, more than one local alignment result 402 may be generated on the two sequences (i.e., sequences 400-2 and 400-4) that are compared.

Example Process

Figure 5A:
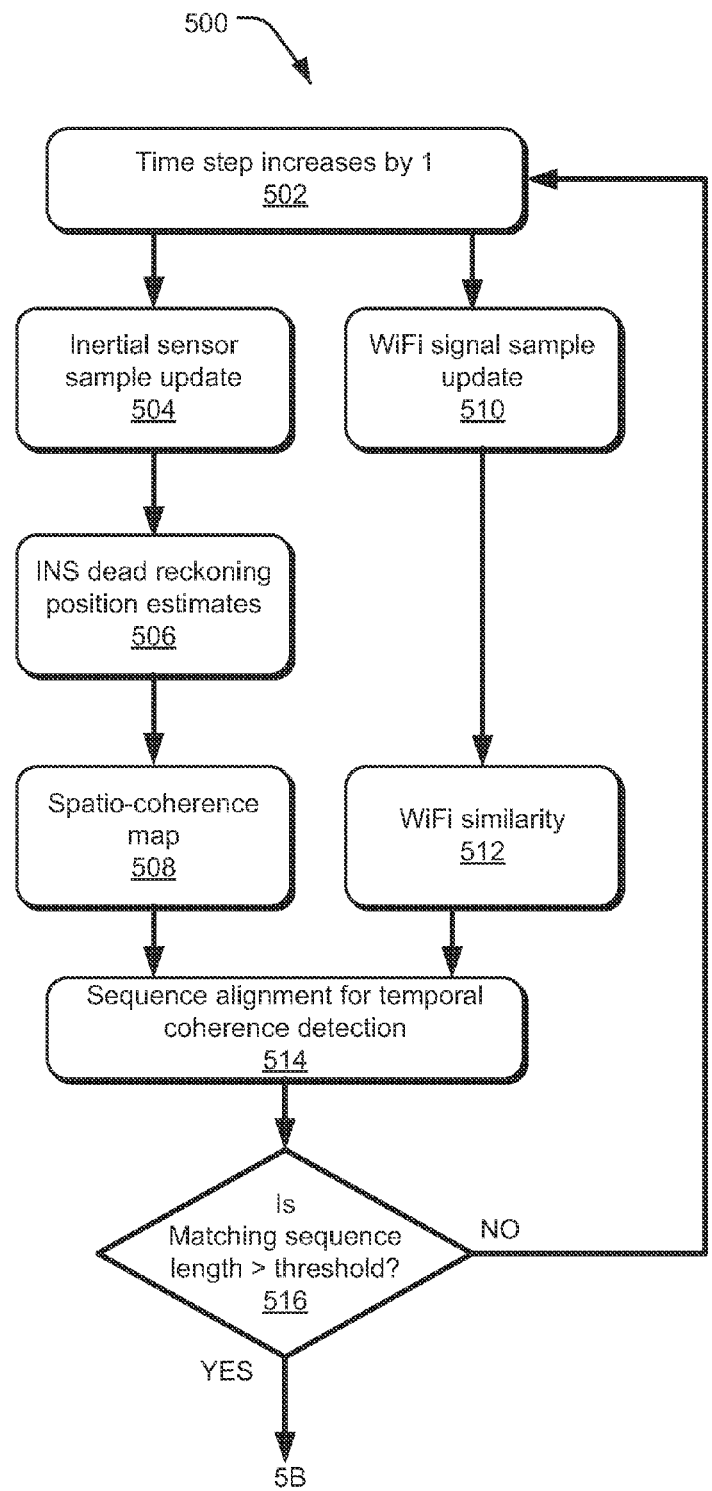
FIG. 5 is an example process chart illustrating an example method for loop closing detection algorithm using WiFi simultaneous localization and mapping (SLAM) algorithm.
Figure 5B:
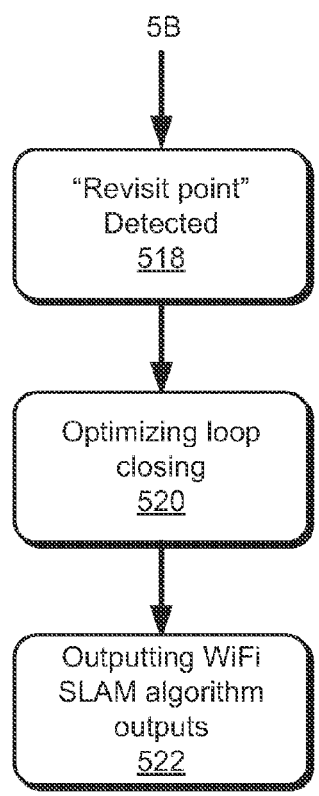

FIG. 5 shows an example process chart illustrating an example method for loop closing detection algorithm using Wifi SLAM precision indoor location based on spatial and temporal coherence. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, a computer accessible medium may implement the WiFi SLAM algorithm for the loop closing detection algorithm.

At block 502, initialing and increasing a time step by one. In an implementation, a time step (e.g., time stamp t) is initialized to a particular number or state. The time step is increased to one step to obtain a current time step. In this implementation, the current time step is adaptive given the power conditions and the environment. For example, the time step increment may include a few milliseconds or few seconds that are adaptive to the power conditions and the environment.

At block 504, updating inertial sensor sample. In an implementation, an INS component (e.g., INS component 206) may perform measurements at the current time stamp. The measurements data may include at least acceleration, rotation rate, heading direction of a wireless device (e.g., wireless device 200).

At block 506, estimating INS dead reckoning position. In an implementation, an INS dead reckoning estimator (e.g., INS dead reckoning estimator component 208) may estimate trajectory on the current time stamp of the wireless device 200 based from the INS measurements data gathered from the INS component 206 at block 504. For example, the estimated trajectory for the wireless device 200 may include current position, orientation, direction, and speed of movement of the wireless device 200 based from a previous position, orientation, direction, and speed of movement of the wireless device 200 on previous time steps, such as "t−1," "t−2," etc.

At block 508, determining spatial coherence of the measurements data is performed. In an implementation, a spatial coherence component (e.g., spatial coherence component 210) may estimate a feature (e.g., feature 302) of a particular segment, which provides indication whether the particular segment includes "revisit points" that the wireless device 200 had previously traversed. For example, the spatial coherence component 210 may implement an algorithm that includes defining the feature 302 at multiple time scale manner in order to capture changes at a higher level of obstruction. In this example, the feature 302 is matched with all other previous feature 302 to find spatial coherence that includes correlation of different segments. In other implementations, distance feature, height feature, and/or inclination feature is estimated to capture different levels of trajectory properties for various user motion patterns.

At block 510, updating WiFi signal sample. In an implementation, a WiFi signal receiver (e.g., WiFi signal receiver 202) may receive a radio signal, such as a WiFi signal (e.g., WiFi signal 218) at the updated time step at block 502. In other implementations, the WiFi signal receiver 202 may include other types of signal receivers that receives and/or transmits cellular phone signals, Bluetooth™ signals, and the like.

At block 512, determining similarity of the updated WiFi signal with previously recorded and/or received WiFi signals. In an implementation, a WiFi similarity component (e.g., WiFi similarity component 204) may implement an algorithm to determine if the updated WiFi signal at block 510 is similar with the previously recorded and received WiFi signal. In this implementation, the WiFi similarity component 204 may provide a first level coarse indicator for the "revisit point" based on the similarity of the updated WiFi signal 218 with the previously recorded and/or received WiFi signal 218.

At block 514, performing sequence alignment for temporal coherence detection. In an implementation, a temporal coherence component (e.g., temporal coherence component 212) may perform sequence alignment on the outputs of blocks 508 and block 512. For example, the temporal coherence component 212 may perform the sequence alignment on a compound of the WiFi signal similarity (derived from block 512) and spatial coherence (derived from block 508) to provide a matching sequence length.

At block 516, comparing the matching sequence length to a threshold. In an implementation, the temporal coherence component 212 is configured to include the threshold when performing several continuous matching of an input sequence (e.g., input sequence 400). If the threshold is satisfied, then the WiFi SLAM algorithm processing continuous at block 518. Otherwise, following the NO signal, the time step is increased by 1 at the block 502.

At block 518, detecting "revisit point" is performed. In an implementation, a loop closing detector (e.g., loop closing detector component 214) may detect a "revisit point" occurrence when the threshold is satisfied. In this implementation, the WiFi SLAM algorithm implements temporal coherence to detect spatial coherence and WiFi similarity at multiple time steps. If the matching time steps satisfies the threshold, then a high chance of obtaining the "revisit point" is estimated. The "revisit point" may be used as an optimization constraint by SLAM algorithm to optimize trajectory estimation and the WiFi fingerprint map generation.

At block 520, optimizing SLAM using "loop closing" constraints is performed. In an implementation, a SLAM optimization component (e.g., SLAM optimization component 216) may utilize the detected "revisit point" from block 518 as the optimization constraint by the WiFi SLAM algorithm to optimize the trajectory estimation and the WiFi fingerprint map generation.

At block 522, outputting location estimates and WiFi fingerprint map. In an implementations, a SLAM output (e.g., SLAM output 218) may include the location estimates for the wireless device 200 and the WiFi fingerprint map.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The term WiFi as used herein refers the Electrical and Electronics Engineers' (IEEE) 802.11 wireless standards, which are widely deployed as part of wireless local area network (WLAN) infrastructure. Indeed, the term WLAN may replace the use of the term WiFi herein. For example, WiFi fingerprinting may be called WLAN fingerprinting and a WiFi signal may be called a WLAN signal.

What is claimed is:

1. A device comprising:
   a WLAN similarity component that implements an algorithm to obtain a first level coarse indicator on a revisit point based from similarities of received radio signal that includes at least a received signal strength indicator (RSSI), signal time-of-flight, or channel fading profiles of the radio signal at different time steps;
   an inertial navigation system (INS) dead reckoning estimator component that estimates motion trajectory of the device at different time steps;
   a spatial coherence component that implements a spatial coherence algorithm to obtain a spatial confidence level on the revisit point by analyzing trajectory structure similarity that is based from the estimated motion trajectory;
   a temporal coherence component that utilizes a fuzzy matching algorithm to detect similarity at multiple time steps on the analyzed trajectory structure similarity and the first level coarse indicator; and
   a loop closing detector that performs a threshold measurement on the detected similarity to determine occurrence of the revisit point.

2. The device as recited in claim 1, wherein the first level coarse indicator includes quantified similarity in measured radio RSSI signals, time-of-flight, or channel fading profiles at the revisit point, wherein the revisit point includes a physical location in a loop that is revisited by the device.

3. The device as recited in claim 1, wherein the analyzing of the trajectory structure similarity is made among different segments at different time steps.

4. The device as recited in claim 1, wherein the spatial coherence algorithm includes a feature that includes at least one of angular, distance, height, and/or inclination to capture the trajectory structure similarity, wherein the feature uses an adaptive time step window size for a particular trajectory segment.

5. The device as recited in claim 1, wherein the spatial coherence algorithm includes an angular feature, distance feature, height future, and/or inclination feature that is defined at a multiple time step scale manner to capture local trajectory change.

6. The device as recited in claim 1, wherein the fuzzy matching algorithm includes a sequence alignment that compares a first sequence to a second sequence to generate multiple alignment results, wherein the first and second sequences include an entry that contains a compound of spatial location features and first level coarse indicator data based on the radio signal similarity.

7. The device as recited in claim 1, wherein the temporal coherence component implements a sequence alignment technique to extract matching sequence of all possible lengths at the multiple time steps.

8. The device as recited in claim 1, wherein the loop closing detector is configured to include a matching sequence threshold to detect the revisit point, wherein the detection of the revisit point location is used as optimization constraints for simultaneous localization and mapping (SLAM).

9. The device as recited in claim 1, further comprising an INS component that provides measurements data to the INS dead reckoning estimator component, wherein the measurements data include calculated position, direction, and orientation of the device along the motion trajectory at different time stamps.

10. A method of implementing a WLAN simultaneous localization and mapping (SLAM) algorithm comprising:
   increasing a time step by one to obtain a current time step;
   updating inertial sensor sample at the current time step;
   estimating inertial dead reckoning position based on the updated inertial sensor sample to obtain estimated trajectory;
   determining spatial coherence of the estimated trajectory, wherein the spatial coherence uses similarity measures that include mean difference, Euclidean distance, or correlation coefficient between coherence features to obtain spatial confidence level;
updating a WLAN signal sample at the current time step;
determining WLAN similarity at a revisit point based on the updated WLAN signal sample at the current time step;
performing sequence alignment on the WLAN similarity and the spatial coherence level at multiple time steps to provide a matching sequence length;
comparing the matching sequence length with a threshold to detect the revisit point; and
outputting optimized location estimates and a WLAN fingerprint map using revisit point constraints based on the sequence alignment for temporal coherence detection.

11. The method as recited in claim 10, wherein the updating inertial sensor sample includes motion measurement data to calculate current position, orientation, direction, and speed of a wireless device.

12. The method as recited in claim 10, wherein the spatial coherence level is derived from a spatial coherence algorithm that includes a feature to capture trajectory structure similarity, wherein the feature uses an adaptive time step window size to capture different levels of trajectory properties for various user motion patterns.

13. The method as recited in claim 10, wherein the spatial coherence algorithm includes angular features, distance features, height features, or inclination features that are defined at a multiple time step scale manner to capture local trajectory change.

14. The method as recited in claim 10, wherein the updating a WLAN signal sample includes updating of received WLAN signal, or a received cellular signal, or a received Bluetooth™ signal.

15. The method as recited in claim 10, wherein the sequence alignment includes a fuzzy matching algorithm that compares a first sequence to a second sequence to generate multiple alignment results, wherein the first and second sequences include an entry that contains a compound of a spatial location and first level coarse indicator data.

16. The method as recited in claim 10, wherein the performing sequence alignment includes implementing a sequence alignment technique to extract matching sequence of all possible lengths at the multiple time steps.

17. The method as recited in claim 10, wherein the performing the sequence alignment is used to detect spatial coherence and WLAN similarity at the multiple time steps.

18. The method as recited in claim 10, wherein the comparing the matching sequence length with a threshold includes increasing the current time step by one if the threshold is not satisfied, wherein the detection of the revisit point is made if the threshold is satisfied.

19. The method as recited in claim 10 further comprising detecting revisit point location wherein the detection of the revisit point location is used as optimization constraints for the SLAM algorithm.

20. At least non-transitory one computer accessible medium that performs a method of implementing a WLAN simultaneous localization and mapping (SLAM) algorithm comprising:
estimating inertial dead reckoning position based on an inertial sensor sample to obtain estimated motion trajectory;
determining spatial coherence level of an estimated motion trajectory obtained by an updated sensor sample, wherein the spatial coherence uses an algorithm to determine similarity of trajectory local structure among different trajectory segments to obtain spatial coherence level;
updating a radio signal sample at a time step;
determining WLAN similarity along traversed trajectory to determine a revisit point based on the updated radio signal;
performing sequence alignment on the WLAN similarity and the spatial coherence level at multiple time steps to obtain a matching sequence length; and
comparing the matching sequence length with a threshold to detect occurrence of the revisit point.

21. The non-transitory computer accessible medium as recited in claim 20, wherein the inertial sensor sample includes data as to motion sensors that detects acceleration, rotation rate, and heading direction of a wireless device to calculate the wireless device's current position, orientation, direction, and speed.

22. The non-transitory computer accessible medium as recited in claim 20, wherein the revisit point includes a physical location that has been previously visited by a wireless device.

23. The non-transitory computer accessible medium as recited in claim 20, wherein the spatial coherence level is derived from the spatial coherence algorithm that includes a feature to capture the trajectory structure similarity, wherein the feature uses an adaptive time step window size to capture different levels of trajectory properties for various user motion patterns.

24. The non-transitory computer accessible medium as recited in claim 20, wherein the spatial coherence algorithm includes angular features, distance features, height features, or inclination features defined at a multiple time step scale manner to capture local trajectory change.

25. The non-transitory computer accessible medium as recited in claim 20, wherein the sequence alignment includes a fuzzy matching algorithm that compares a first sequence to a second sequence to generate multiple alignment results, wherein the first and second sequences include an entry that contains a compound of a spatial location and first level coarse indicator data.

26. The non-transitory computer accessible medium as recited in claim 20, wherein the detection of the revisit point is used as optimization constraints for the SLAM algorithm.

27. The non-transitory computer accessible medium as recited in claim 20, wherein the WLAN algorithm is implemented on a device that is selected from one of a server, a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

28. The non-transitory computer accessible medium as recited in claim 20 further comprising using the detected revisit point as optimization constrains by the WLAN SLAM algorithm to optimize trajectory estimation and WLAN fingerprint map generation.

29. The non-transitory computer accessible medium as recited in claim 20 further comprising outputting optimized location estimates and a WLAN fingerprint map using revision point constraints based on the sequence alignment for temporal coherence detection.

* * * * *